United States Patent
Wu et al.

(10) Patent No.: US 11,314,713 B2
(45) Date of Patent: Apr. 26, 2022

(54) DATA DISCOVERY IN RELATIONAL DATABASES

(71) Applicant: Rubrik, Inc., Palo Alto, CA (US)

(72) Inventors: Di Wu, East Palo Alto, CA (US); Matthew E. Noe, San Francisco, CA (US); Biswaroop Palit, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 214 days.

(21) Appl. No.: 16/015,963

(22) Filed: Jun. 22, 2018

(65) Prior Publication Data

US 2019/0392059 A1    Dec. 26, 2019

(51) Int. Cl.
*G06F 16/22* (2019.01)
*G06F 16/2457* (2019.01)

(52) U.S. Cl.
CPC ...... *G06F 16/2282* (2019.01); *G06F 16/2457* (2019.01)

(58) Field of Classification Search
CPC ............ G06F 16/284; G06F 21/602; G06F 2221/2107; G06F 16/9024; G06F 21/6245; G06F 21/6254; G06F 21/60
See application file for complete search history.

(56) References Cited

U.S. PATENT DOCUMENTS

| | | | | |
|---|---|---|---|---|
| 5,778,388 A * | 7/1998 | Kawamura | | G06F 11/1466 |
| 6,108,664 A * | 8/2000 | Nori | | G06F 16/289 |
| 6,546,394 B1 * | 4/2003 | Chong | | G06F 16/2282 |
| 7,885,944 B1 * | 2/2011 | Bruening | | G06F 16/33 |
| | | | | 707/694 |
| 2001/0054142 A1 * | 12/2001 | Van Blarkom | | G06F 21/6254 |
| | | | | 713/151 |
| 2003/0074564 A1 * | 4/2003 | Peterson | | G06F 21/6245 |
| | | | | 713/182 |
| 2004/0148275 A1 * | 7/2004 | Achlioptas | | G06F 16/9535 |
| 2004/0199528 A1 * | 10/2004 | Kayamoto | | G06F 16/24573 |
| 2006/0041930 A1 * | 2/2006 | Hafeman | | G06F 21/6245 |
| | | | | 726/2 |
| 2006/0085443 A1 * | 4/2006 | Pae | | G06F 21/6245 |
| 2008/0270370 A1 * | 10/2008 | Castellanos | | G06F 21/6227 |
| 2012/0131075 A1 * | 5/2012 | Mawdsley | | G06F 21/6254 |
| | | | | 707/825 |
| 2015/0242607 A1 * | 8/2015 | Morris | | H04L 63/0407 |
| | | | | 713/186 |
| 2017/0091680 A1 * | 3/2017 | Rosenthal | | G06Q 10/0635 |
| 2017/0243028 A1 * | 8/2017 | LaFever | | G06F 21/6263 |

(Continued)

*Primary Examiner* — Cheyne D Ly
(74) *Attorney, Agent, or Firm* — Holland & Hart LLP (57) ABSTRACT

Described herein is a system that processes personal data in databases. The system samples data stored in columns of data tables and analyzes the sampled data to determine whether the sampled data includes personal data. Based on the analysis, the system marks which data tables and which columns of the data tables store personal data. The system receives a request to process personal data for a subject. From data tables that are marked as storing personal data, the system identifies records storing personal data for the subject. The system additionally identifies other data tables marked as storing personal data that reference or are referenced by the data tables including the records referencing the subject. The system processes the data stored in the columns that are marked as storing personal data.

20 Claims, 9 Drawing Sheets

(56) References Cited

U.S. PATENT DOCUMENTS

| | | | | |
|---|---|---|---|---|
| 2017/0286765 A1* | 10/2017 | Rodriguez | ......... | G06K 9/00456 |
| 2017/0344646 A1* | 11/2017 | Antonopoulos | .... | G06F 16/2453 |
| 2017/0357906 A1* | 12/2017 | Bishop | ..................... | G06N 5/04 |
| 2018/0219681 A1* | 8/2018 | Geiman | ................ | H04L 9/3226 |
| 2019/0114438 A1* | 4/2019 | Hersans | ................ | H04L 9/0891 |

* cited by examiner

FIG. 1

Order Table 202

| Order No. | User ID | CC Card No. | Shipping Address |
|---|---|---|---|
| 508 | 134856 | 789253 | |
| 509 | 284953 | 453681 | |
| ... | ... | ... | |
| 761 | 198534 | 357951 | |
| 762 | 256316 | 614859 | |

Credit Card Table 206

| CC Card No. | First Name | Last Name | Expiration Date | Security Code | Billing Address |
|---|---|---|---|---|---|
| 789253 | Rick | Sanchez | 04/20 | 312 | 12 Fantasy Way, D.C., 20023 |
| 453681 | Morty | Smith | 08/19 | 640 | 12 Fantasy Way, D.C., 20023 |
| ... | ... | ... | ... | ... | |
| 357951 | Dev | Shah | 10/18 | 408 | 1414 Central Park, New York, NY 10019 |
| 614859 | Arnold | Baumheiser | 11/18 | 154 | 50 Greenwich Ave, New York, NY 10018 |

User Table 204

| User ID | First name | Last name | Profession | DoB | Phone no. | Address |
|---|---|---|---|---|---|---|
| 134856 | Rick | Sanchez | Scientist | 02/16/1958 | 2021268645 | 12 Fantasy Way, Washington D.C., 20023 |
| 284953 | Morty | Smith | Student | 08/23/2002 | 2024668352 | 12 Fantasy Way, Washington D.C., 20023 |
| ... | ... | ... | ... | ... | ... | |
| 198534 | Dev | Shah | Actor | 04/05/1982 | 9175198632 | 1414 Central Park, New York, NY 10019 |
| 256316 | Arnold | Baumheiser | Self-employed | 06/12/1981 | 6462504589 | 50 Greenwich Ave, New York, NY 10018 |

DATA DISCOVERY IN RELATIONAL DATABASES

BACKGROUND

1. Technical Field

The present invention generally relates to managing and storing data in relational databases, and more specially relates to discovering personal information stored in relational databases.

2. Background Information

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure. Another aspect is data portability across locations and platforms.

At the same time, to comply with various privacy laws and regulations, organizations are responsible for locating and removing personal information stored when requested. In any large organization with multiple disparate databases and systems of records, this is a human-driven and time-consuming task to build and maintain a comprehensive catalog of where personal information may exist.

SUMMARY

Described herein is a system that processes personal data in databases. A database can be a relational database that includes data tables. A data table includes columns of attributes and rows of records. The system samples data stored in columns of the data tables and analyzes the sampled data to determine whether the sampled data includes personal data. For example, the system compares the sampled data to a list of known types of personal data to determine whether the sampled data for a column matches any known type of personal data. Based on the analysis, the system marks which data tables and which columns of the data tables store personal data. The system receives a request to process personal data for a subject. From data tables that are marked as storing personal data, the system identifies records storing personal data for the subject. The system additionally identifies other data tables marked as storing personal data that reference or are referenced by the data tables including the records referencing the subject. The system processes the data stored in the columns that are marked as storing personal data.

Other aspects include components, devices, systems, improvements, methods, processes, applications, computer readable mediums, and other technologies related to any of the above.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
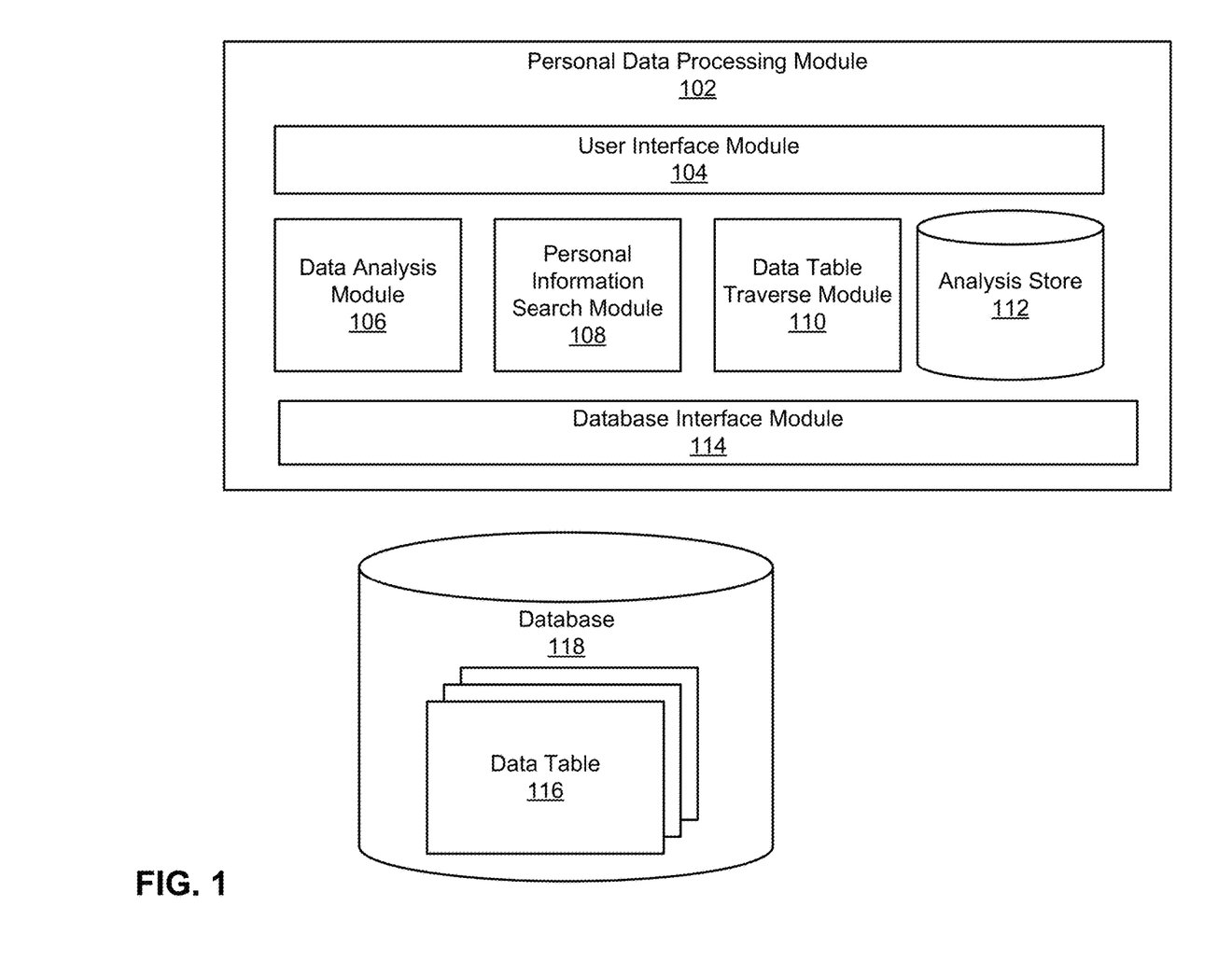
FIG. 1 is a block diagram of an example personal data processing module for processing personal data, according to one embodiment.

FIG. 1 illustrates an example personal data processing module 102, according to one embodiment. The personal data processing module 102 processes data stored in a database 118 to identify personally identifiable information (PII) in the data. PII is information that identifies an individual by itself or along with other information. PII is also referred to herein as personal data. In various embodiments, the database 118 is a relational database. The database 118 includes data tables 116 that store data. A data table 116 includes columns and rows. Data stored in the data table 116 is organized by the columns and rows. A column corresponds to an attribute and a row corresponds to a record. That is, data of the same attribute is stored in the same column. Data that represents one item is stored in the same row. The personal data processing module 102 identifies which data table stores data that includes PII and which data table stores PII of a particular individual. In particular, the personal data processing module 102 identifies which column of a particular data table stores data that includes PII and which row of a particular data table stores PII of the particular individual.

The personal data processing module 102 includes a user interface module 104, a data analysis module 106, a personal information search module 108, a data table traverse module 110, an analysis store 112, and a database interface module 114, all of which are further described below.

The user interface module 104 provides user interfaces that allow users to interact with the personal data processing module 102. For example, the user interface module 104 provides one or more user interfaces to a client device for a user to provide various input. Via a user interface, a user can specify one or more data tables to be analyzed for determining whether the data tables store PII, can specify one or more columns to be analyzed for determining whether a selected column stores PII, or to specify an individual (data subject) for determining which data tables store the individual's PII. Data including the information input by the user is stored in the analysis store 112. As another example, the user interface module 104 provides one or more user interfaces to the client device to present analysis results such as which data tables store PII, which columns of a data table store PII, which data tables store a particular individual's PII, or which rows of a data table store a particular individual's PII. Data including the analysis results is stored in the analysis store 112.

The data analysis module 106 analyzes data stored in the database 118 to determine whether the stored data includes PII. In particular, the data analysis module 106 determines which data tables and which columns of the data tables store data including PII. In various embodiments, the data analysis module 106 analyzes data stored in a column to determine whether the data includes PII. The data analysis module 106 may analyze all columns of a data table to determine which columns store data that includes PII. Alternatively, the data analysis module 106 analyzes columns that are specified by a user. The data analysis module 106 may analyze all data tables 116 in the database 118 or data tables 116 specified by a user.

To determine whether a particular column stores PII, the data analysis module 106 analyzes the data stored in the particular column by sampling data stored in the column and analyzing the sampled data. The data analysis module 106 analyzes the sampled data against a list of known types of personal data to determine whether the sampled data matches any known type of personal data. The data analysis module 106 determines whether characteristics of the sampled data match characteristics of any known type of personal data. If the characteristics of the sampled data match characteristics of a known type of personal data, the data analysis module 106 determines that the particular column stores the known type of personal data. If the sampled data does not match any known type of personal data, the data analysis module 106 determines that the particular column does not store personal data.

Personal data is any information related to an individual. The known type of personal data is determined according to privacy laws and regulations. In some embodiments, the know type of personal data is determined according to General Data Protection Regulation (GDPR). For example, the known types of personal data include names (e.g., first, middle, last), personal identity information (e.g., a taxpayer identification number, a social security number, a passport number, a health care provider identifier such as a DEA (Drug Enforcement Administration) number, a driver license number, an employer identification, a vehicle identification number (VIN), an insurance number, an election number, a public service number, a national number, a national identity number, a citizen service number, a citizen card number), home addresses (e.g., city, state), email addresses, phone numbers, financial information (e.g., a credit card number, a debit card number, banking information (e.g., a bank routing number, a bank account number,) investment information (e.g., an investment account number, a security identification number, etc.), posts on social networks, medical information (e.g., an health care account number, a medical record number, a patient identification number, a health care provider identifier, prescription information such as a drug identifier, etc.), IP addresses, MAC addresses, domain names, device identifiers (e.g., an IMEI (international mobile equipment identity)), etc. A system administrator can configure a list of predetermined know types of personal data.

The data analysis module 106 determines whether the sampled data matches a list of predetermined known types of personal data in a variety of ways. For example, the data analysis module 106 matches the sampled data against predetermined text strings or characters such as a dictionary of names, a list of locations, a list of domain names, a list of symbols (e.g., "@", "#", etc.), a list of email service providers, a list of bank names, a list of country codes, a list of area codes, a list of hospital (or other health care provider) names, a list of city names, a list of state (or province) names, a list of drug (or other health care product) names, a list of diseases, and the like. As another example, the data analysis module 106 matches the sampled data against predetermined formats such as phone number formats, address formats, ID formats, ID number formats, name formats, date of birth formats, IP address formats, credit (debit) card formats, and the like. As a further example, the data analysis module 106 matches the sampled data against identified personal data or a format of the identified personal data. The identified personal data is data stored in other columns that have already been identified as personal data. If the stored data includes images rather than text strings, the data analysis module 106 can perform optical character recognition techniques to recognize any texts in the images.

If there is a match, then the data analysis module 106 determines that the sampled data includes personal data. The data analysis module 106 may calculate a matching score indicating a degree of the sampled data matching the predetermined know types of personal data. For example, a matching score of 1 indicates that the sampled data matches a known type of personal data whereas a matching score of 0 indicates that the sampled data does not match a known type of personal data. If a matching score for sampled data and a particular known type of personal data is greater than a threshold, the data analysis module 106 determines that the column stores data that belongs to the particular known type of personal data.

The data analysis module 108 marks which data tables and which columns within each data table stores personal data. The data analysis module 108 stores the analysis results in the analysis store 112. The data analysis module 108 performs the marking as a background job that is separate from responding to a request. In some embodiments, the data analysis module 108 associates the analysis results with a data table and stores the data table associated with the analysis results in conjunction with backup of the data table. That is, marking which tables and which columns within each table contain personal data is performed in conjunction with backup of the relational database 118.

Figure 2:
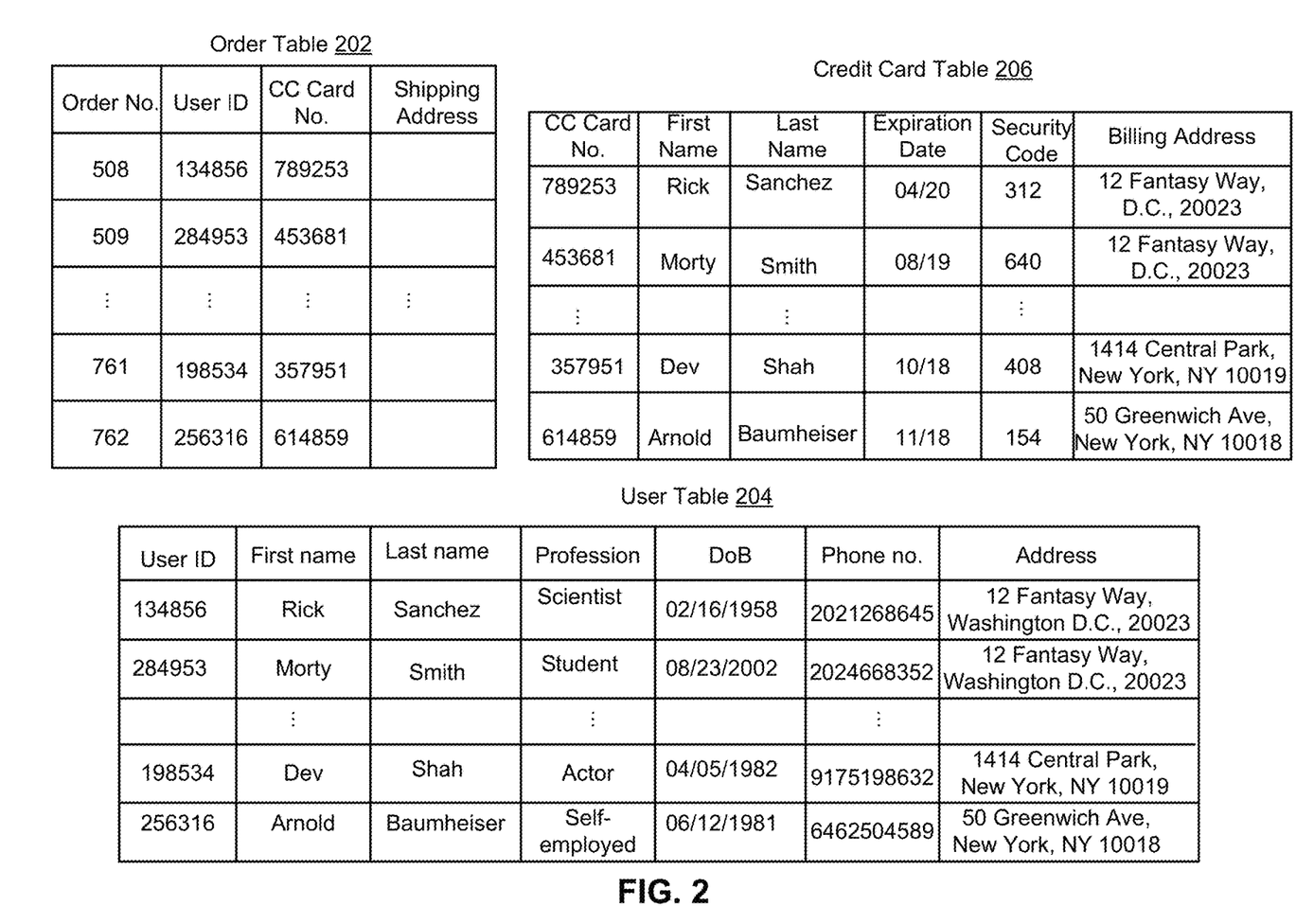
FIG. 2 illustrates example data tables, according to one embodiment.

The personal information search module 108 searches for personal data of a particular individual (data subject) according to a user's request. The user's request includes information identifying the particular individual. The personal information search module 108 locates records that include the particular individual's personal data by searching the information identifying the particular individual in the data tables 116 that are marked as storing personal data. For example, a user inputs Maria's information such as the name, birthday, and address for locating Maria's personal data in the database 118. The personal information search module 108 locates data records that include Maria's personal data in the database 118. The information provided by the user may include a primary key that uniquely identifies a row in a database table. For example, as illustrated in FIG. 2, an order number is a primary key that uniquely identifies a record in the order table 202, a credit card number is a primary key that uniquely identifies a credit card record in the credit card table 206, and a user ID is a primary key that uniquely identifies a user record in the user table 204. A primary key of one table can be a foreign key of another table. For example, the user ID is a foreign key of the order table 202 because it uniquely identifies a record in the user table 204.

However, some data tables that store personal data for the particular individual may not store the particular individual's information input by the user. As a result, the personal information search module 108 may not find all records that include the particular individual's personal data across the data tables 116. To find all records including personal data for a particular individual, the personal data processing module 102 looks up other data tables that reference or are referenced by the data tables that store data records including the individual's personal data as determined by the personal information search module 108. Referring to FIG. 2, if a user inputs Morty Smith to locate Morty's personal data stored in the order table, credit card table, and user table, the personal information search module 108 determines records that store Morty's information from the credit card table 206 and the user table 204 by searching for the name "Morty Smith". However, records corresponding to Morty Smith's are not found in the order table 202 because the order table 202 does not store names.

For a particular individual, the data table traverse module 110 determines other data tables that reference or that are referenced by the data tables storing the particular individual's personal data as determined by the personal information search module 108. For example, if the personal information search module 108 determines a first set of data tables that store records including the particular user's personal data, the data table traverse module 110 determines a second set of data tables referenced by or referencing the first set of data tables. A data table references another data table if it uses data of a column of the other data table. For example, as illustrated in FIG. 2, the order table 202 references the user table 204 by using the user ID column of the user table 204, which is the primary key in the user table 204. The order table 202 also references the credit card table 206 by using the credit card no. column of the credit card table 206, which is the primary key in the credit card table 206. The credit card table 206 references the user table 204 by using the first name and the last name columns of the user table 204. Continue with the Morty example, the data table traverse module 110 traverses from the user table 204 to the order table 202 to find records storing Morty's personal data in the order table 202.

Figure 3:
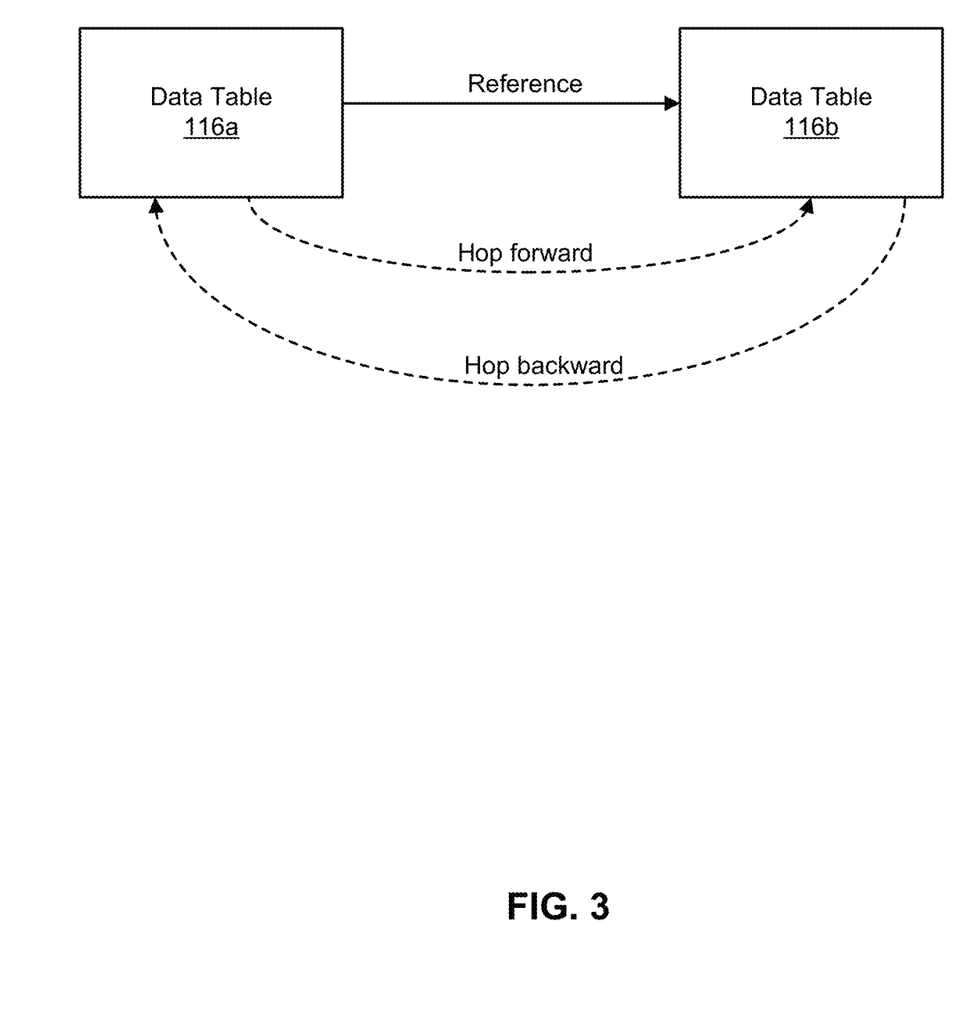
FIG. 3 illustrates a data table referencing another data table, according to one embodiment.

The data table traverse module 110 traverses between different data tables according to the references between the data tables. As illustrated in FIG. 3, the data table 116a references the data table 116b. The data table traverse module 110 can hop forward from the data table 116a to the data table 116b, for example, by using a foreign key of the data table 116a (a primary key of the data table 116b). Conversely, the data table traverse module 110 can hop backward from the data table 116b to the data table 116a, for example, by using the primary key of the data table 116b (also the primary key of the data table 116a).

Figure 4:
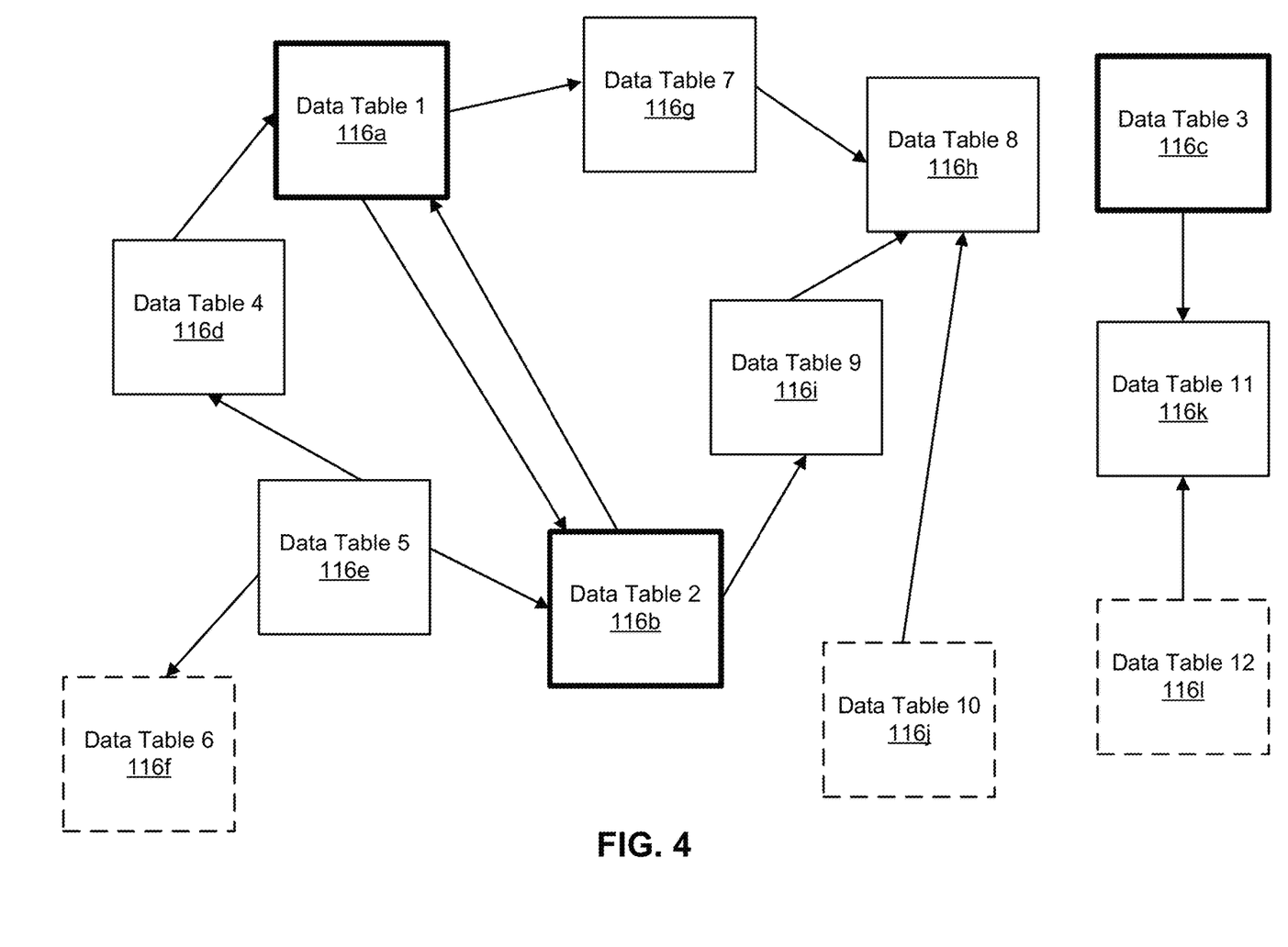
FIG. 4 illustrates an example graph of data tables referencing other data tables, according to one embodiment.

The data table traverse module 110 traverses across all data tables 116 that are marked to store personal data to locate data tables that reference or that are referenced by data tables including data records storing a particular individual's personal data. In some embodiments, the data table traverse module 110 constructs a graph of which data tables referencing which other tables. The data tables are marked as storing personal data. The data table traverse module 110 traverses the graph to locate data tables that are referenced by or that reference the data tables determined by the personal information search module 108. As illustrated in FIG. 4, the data tables 1-3 (bolded) are determined by the personal information search module 108 as storing records including a particular user's personal data. Starting from the data table 1, the data table traverse module 110 hops forward to the data table 7 and the data table 2, and continuously to the data table 8 and the data table 9. From the data table 8, the data table traverse module 110 hops backwards to the data table 10. The data table traverse module 110 hops backwards from the data table 1 to the data table 4, continuously to the data table 5, then to the data table 6. Starting from the data table 3, the data table traverse module 110 hops forward to the data table 11, then to the data table 12. The data tables 4-12 also include the individual's personal data.

After determining the data tables that either reference or are referenced by the data tables determined to include data records storing a particular user's personal data, the data table traverse module 110 determines the specific records that store the particular user's personal data in each determined data table. Specifically, in each determined data table, the data table traverse module 110 determines one or more rows that either are referenced by or reference the one or more rows that are determined as storing the particular user's personal data. The data table traverse module 110 may determine one or more rows that reference the data subject (i.e., the individual). In some cases, the data table traverse module 110 can hop back and forth between two data tables to locate data records that store a user's personal data.

Figure 5A:
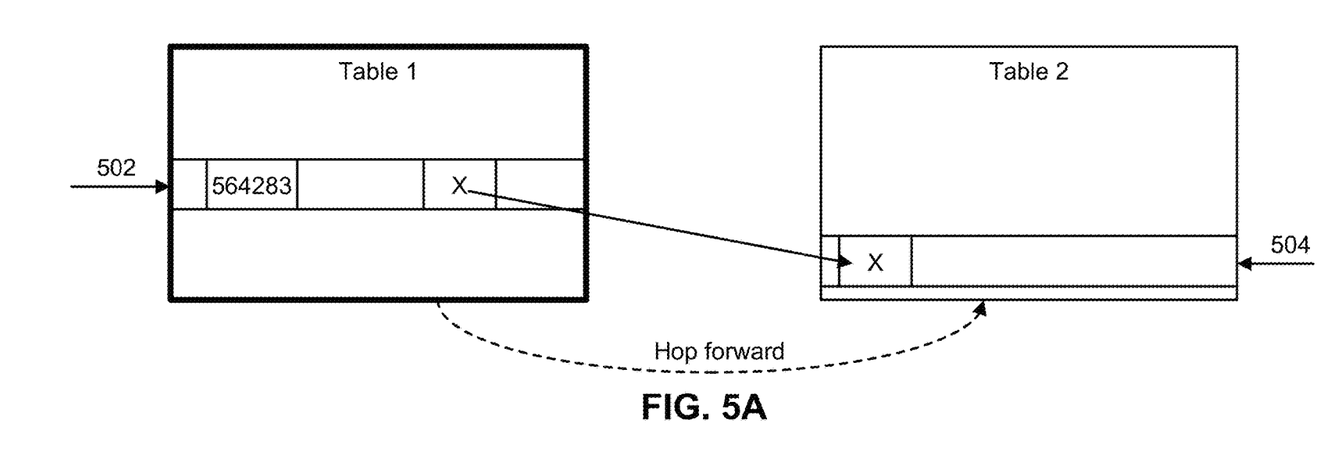
FIGS. 5A-B illustrate traversing between data tables to locate records storing personal data, according to one embodiment.

As illustrated in FIG. 5A, the data table traverse module 110 hops forward from the data table 1 to table 2. In the data table 1 (bolded), the record 502 is determined to include a particular user's personal data. Column 1 of the record 502 stores the personal data. The data table traverse module 110 determines that the record 504 corresponds to the particular user because the record 504 is referenced by the record 502. The personal data processing module 102 processes data stored in columns that are marked as storing personal data for the record 504.

Figure 5B:
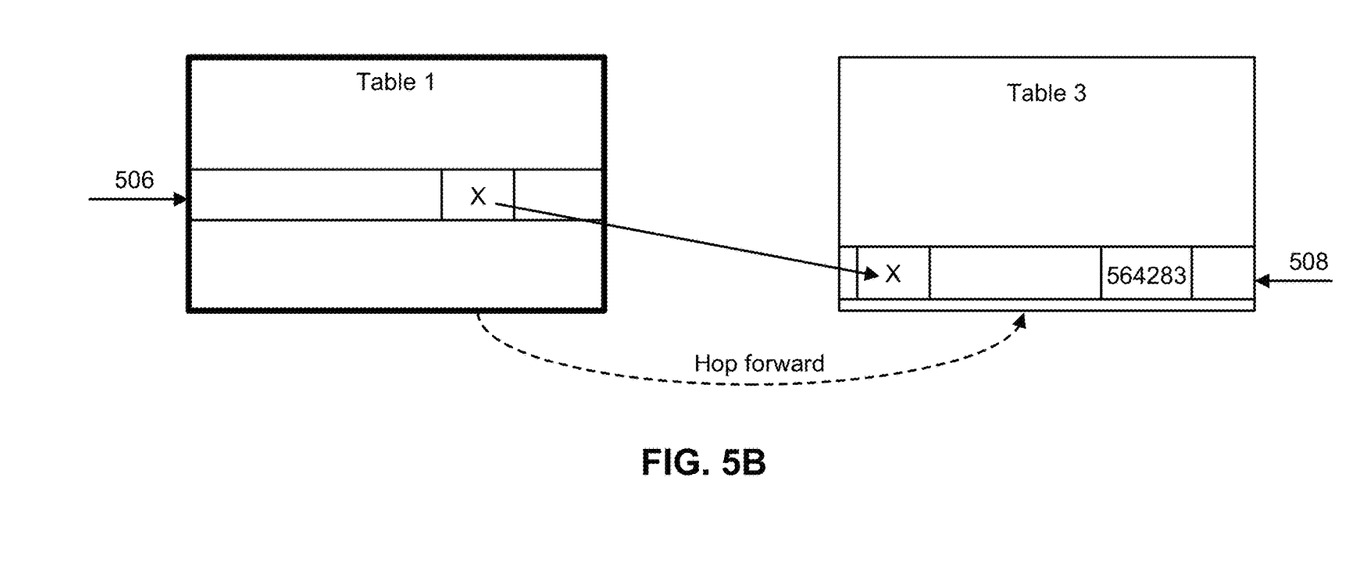

As illustrated in FIG. 5B, the data table traverse module 110 hops forward from the data table 1 to data table 3. In the data table 1 (bolded), the record 506 is determined to include a particular user's personal data. The data table traverse module 110 determines that the record 508 corresponds to the particular user because column 9 of the data table 1 references column 2 of the data table 2. The personal data processing module 102 processes data stored in columns that are marked as storing personal data for the record 508. For example, the data table processing module 102 determines that column 8 of the data table 2 stores the particular user's personal data.

Figure 6A:
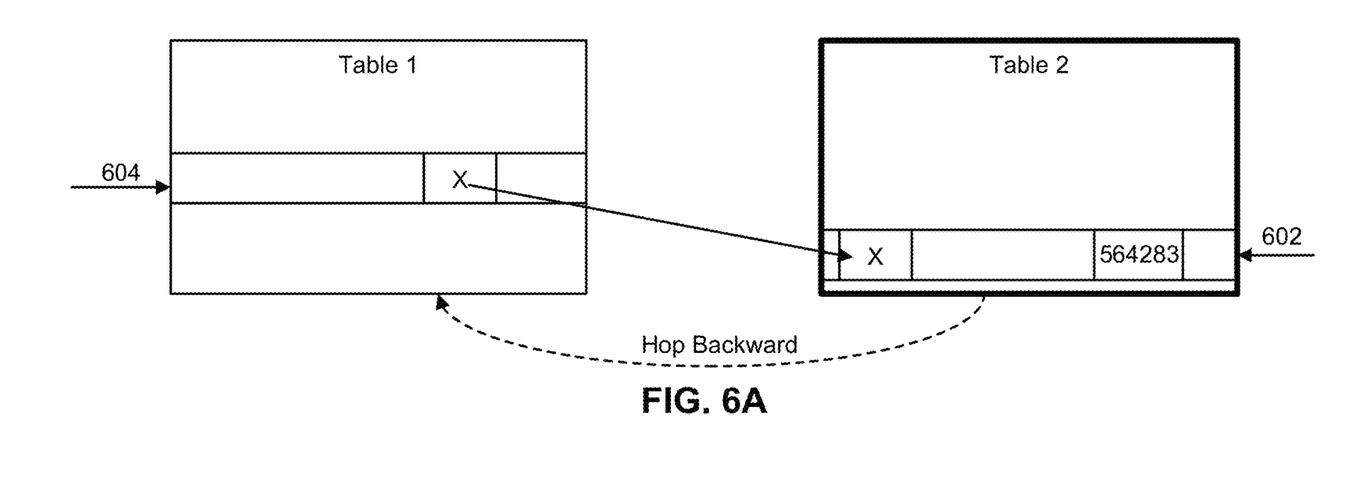
FIGS. 6A-B illustrate traversing between data tables to locate records storing personal data, according to one embodiment.

As illustrated in FIG. 6A, the data table traverse module 110 hops backward from the data table 2 to data table 1. In the data table 2 (bolded), the record 602 is determined to include a particular user's personal data. Column 10 of the record 602 stores personal data. The data table traverse module 110 determines that the record 604 corresponds to the particular user because column 7 of the data table 1 references column 1 of the data table 2. The personal data processing module 102 processes data stored in columns that are marked as storing personal data for the record 508.

Figure 6B:
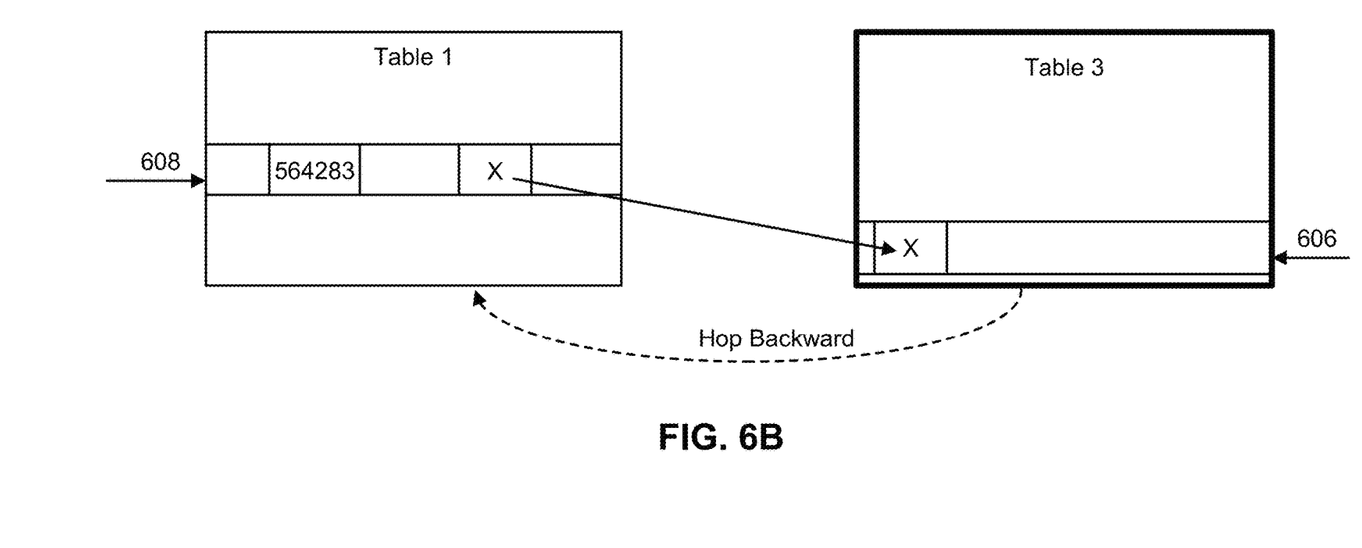

As illustrated in FIG. 6B, the data table traverse module 110 hops backward from the data table 3 to data table 1. In the data table 3 (bolded), the record 606 is determined to include personal data of a particular user. Column 1 of the record 606 stores personal data. Column 9 of the data table 1 references column 1 of the data table 3. The data table traverse module 110 determines that the record 608 corresponds to the particular user. The data table traverse module 110 determines that column 2 of the data table 1 stores the particular user's personal data.

The personal data processing module 102 processes the identified personal data. For example, the personal data processing module 102 removes data from columns that are marked as storing personal data. As another example, the personal data processing module 102 produces data from columns that are marked as storing personal data to users.

The database interface module 114 interfaces with the database 118. Via the database interface module 114, other components of the personal data processing module 102 such as the data analysis module 106, personal information search module 108, and data table traverse module 110 can access and modify data stored in the database 118.

The personal data processing module illustrated in FIG. 1 processes personal data, according to one embodiment. The example personal data processing module can process personal data in a compute infrastructure 702 as illustrated in FIG. 7.

Figure 7:
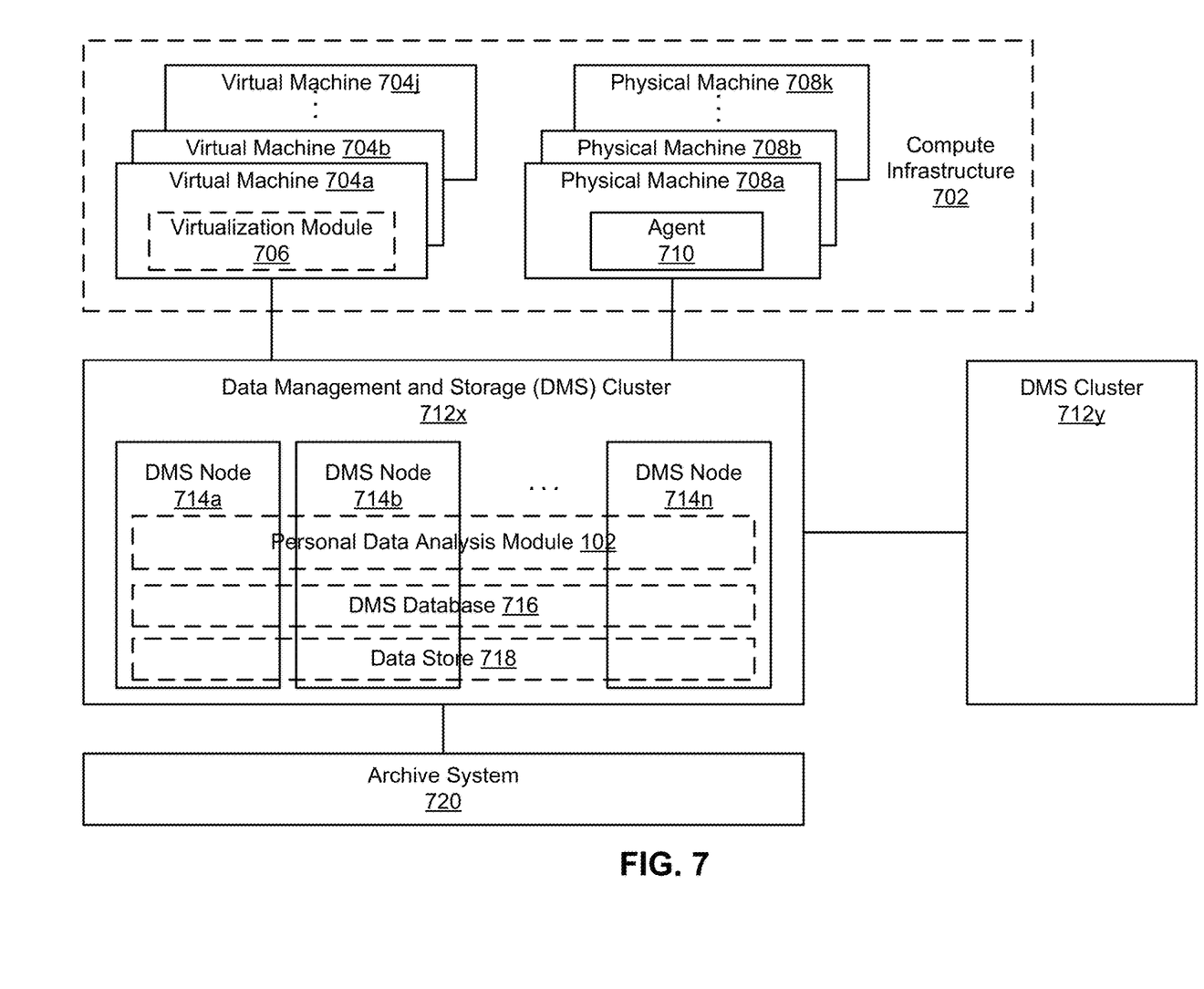
FIG. 7 is a block diagram of a system for managing and storing data, according to one embodiment.

In more detail, FIG. 7 is a block diagram illustrating a system for managing and storing data, according to one embodiment. The system includes a data management and storage (DMS) cluster 712x, a secondary DMS cluster 712y and an archive system 720. The DMS system provides data management and storage services to a compute infrastructure 702, which may be used by an enterprise such as a corporation, university, or government agency. Many different types of compute infrastructures 702 are possible. Some examples include serving web pages, implementing e-commerce services and marketplaces, and providing compute resources for an enterprise's internal use. A specific example is a compute infrastructure for serving a web application, which is powered by a web server running on a VM and a SQL database. Another example is an NFS share with legal documents for a law firm that is continuously versioned. The compute infrastructure can include production environments, in addition to development or other environments.

In this example, the compute infrastructure 702 includes both virtual machines (VMs) 704a-j and physical machines (PMs) 708a-k. The VMs 704 can be based on different hypervisors. VMware, Microsoft Hyper-V, Microsoft Azure, GCP (Google Cloud Platform), Nutanix AHV, Linux KVM (Kernel-based Virtual Machine), and Xen are some examples. The physical machines 708a-n can also use different operating systems running various applications. Microsoft Windows running Microsoft SQL or Oracle databases, and Linux running web servers are some examples.

The DMS cluster 712 manages and stores data for the compute infrastructure 702. This can include the states of machines 704,708, configuration settings of machines 704, 708, network configuration of machines 704,708, data stored on machines 704,708, and corresponding metadata. Example DMS services includes backup, recovery, replication, archival, and analytics services. The primary DMS cluster 712x enables near instant recovery of backup data. Derivative workloads (e.g., testing, development, and analytic workloads) may also use the DMS cluster 712x as a primary storage platform to read and/or possibly modify past versions of data. The DMS cluster 712 also processes personal data stored in the compute infrastructure 702.

In this example, to provide redundancy, two DMS clusters 712x-y are used. From time to time, data stored on DMS cluster 712x is replicated to DMS cluster 712y. If DMS cluster 712x fails, the DMS cluster 712y can be used to provide DMS services to the compute infrastructure 702 with minimal interruption.

Archive system 720 archives data for the computer infrastructure 702. The archive system 720 may be a cloud service. The archive system 720 receives data to be archived from the DMS clusters 712. The archived storage typically is "cold storage," meaning that more time is required to retrieve data stored in archive system 720. In contrast, the DMS clusters 712 provide much faster backup recovery.

The following examples illustrate operation of the DMS cluster 712 for backup and recovery of VMs 704. This is used as an example to facilitate the description. The same principles apply also to PMs 708 and to other DMS services.

Each DMS cluster 712 includes multiple peer DMS nodes 714a-n that operate autonomously to collectively provide the DMS services, including managing and storing data. A DMS node 714 includes a software stack, processor and data storage. DMS nodes 714 can be implemented as physical machines and/or as virtual machines. The DMS nodes 714 are interconnected with each other, for example, via cable, fiber, backplane, and/or network switch. The end user does not interact separately with each DMS node 714, but interacts with the DMS nodes 714a-n collectively as one entity, namely, the DMS cluster 712.

Preferably, the DMS nodes 714 are peers and each DMS node 714 includes the same functionality. The DMS cluster 712 automatically configures the DMS nodes 714 as new nodes are added or existing nodes are dropped or fail. In this way, the computing power and storage capacity of the DMS cluster 712 is scalable by adding more nodes 714.

The DMS cluster 712 includes the personal data analysis module 102, a DMS database 716, and a data store 718. The functionality of the personal data analysis module 102 is distributed across the nodes 714. For example, each DMS nodes includes software stacks that include at least a job scheduler and a job engine, and the DMS database 116 includes data structures that include at least a job queue. The job schedulers create jobs to be processed by the job engines. These jobs are posted to the job queue. Example jobs include analyze data, pull snapshots (take a snapshot of a machine), replicate (to the secondary DMS cluster), and archive, etc. The jobs can be determined according to the service schedule or the DMS cluster's operation separate from the service schedule.

The DMS database 716 stores data structures used in providing the DMS services, as will be described in more detail in FIG. 2. In the following examples, the DMS database 716 and the data store 718 are shown as tables but other data structures could also be used. The data store 718 contains the actual backup data from the compute infrastructure 702, for example snapshots of VMs or application files. Both the DMS database 716 and the data store 718 are distributed across the nodes 714, for example using Apache Cassandra and Atlas. That is, the DMS database 716 in its entirety is not stored at any one DMS node 714. Rather, each DMS node 714 stores a portion of the DMS database 716 but can access the entire DMS database. Data in the DMS database 716 preferably is replicated over multiple DMS nodes 714 to increase the fault tolerance and throughput, to optimize resource allocation, and/or to reduce response time. In one approach, each piece of data is stored on at least three different DMS nodes. The data store 718 has a similar structure, although data in the data store may or may not be stored redundantly. Accordingly, if any DMS node 714 fails, the full DMS database 716 and the full functionality of the DMS cluster 712 will still be available from the remaining DMS nodes. As a result, the DMS services can still be provided.

Considering each of the other components shown in FIG. 7, a virtual machine (VM) 704 is a software simulation of a computing system. The virtual machines 704 each provide a virtualized infrastructure that allows execution of operating systems as well as software applications such as a database application or a web server. A virtualization module 706 resides on a physical host (i.e., a physical computing system) (not shown), and creates and manages the virtual machines 704. The virtualization module 706 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 706 provides an interface for other computing devices to interface with the virtualized infrastructure. In the following example, the virtualization module 706 is assumed to have the capability to take snapshots of the VMs 704. An agent could also be installed to facilitate DMS services for the virtual machines 704.

A physical machine 708 is a physical computing system that allows execution of operating systems as well as software applications such as a database application or a web server. In the following example, an agent 710 is installed on the physical machines 708 to facilitate DMS services for the physical machines.

The components shown in FIG. 7 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 7 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

Figure 8:
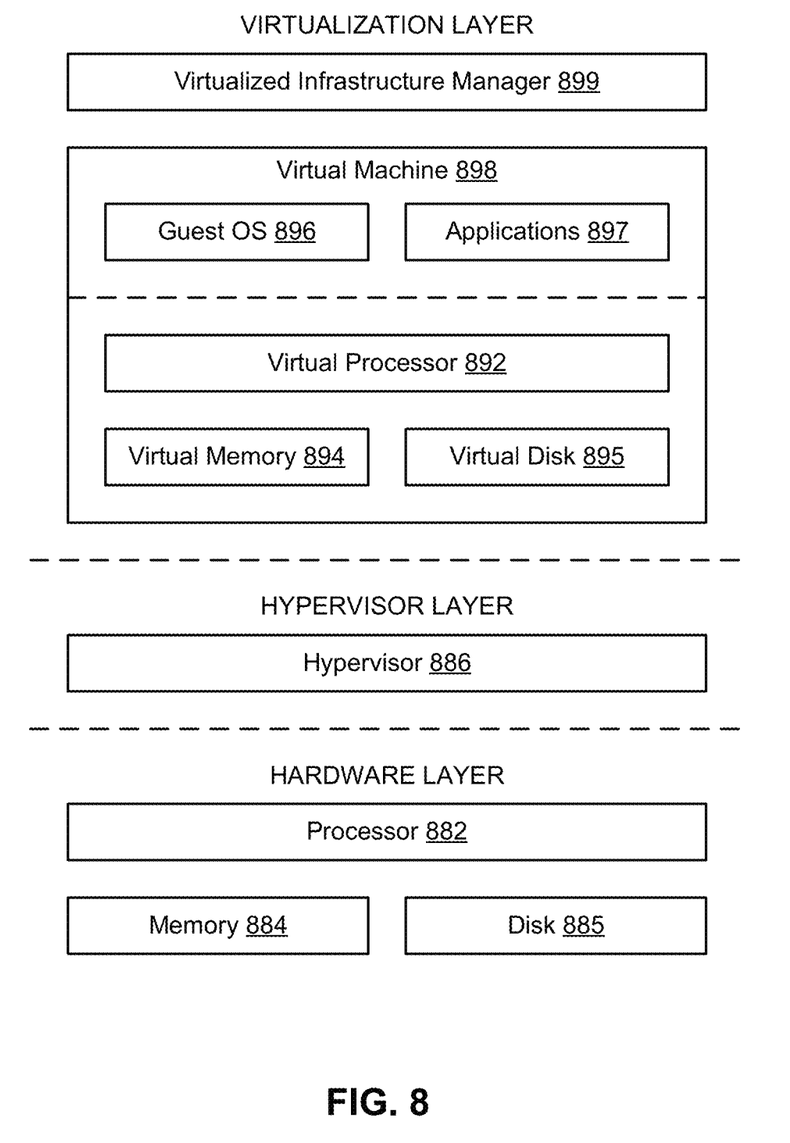
FIG. 8 is a block diagram of a virtual machine, according to one embodiment.

FIG. 8 is a block diagram of a server for a VM platform, according to one embodiment. The server includes hardware-level components and software-level components. The hardware-level components include one or more processors 882, one or more memory 884, and one or more storage devices 885. The software-level components include a hypervisor 886, a virtualized infrastructure manager 899, and one or more virtual machines 898. The hypervisor 886 may be a native hypervisor or a hosted hypervisor. The hypervisor 886 may provide a virtual operating platform for running one or more virtual machines 898. Virtual machine 898 includes a virtual processor 892, a virtual memory 894, and a virtual disk 895. The virtual disk 895 may comprise a file stored within the physical disks 885. In one example, a virtual machine may include multiple virtual disks, with each virtual disk associated with a different file stored on the physical disks 885. Virtual machine 898 may include a guest operating system 896 that runs one or more applications, such as application 897. Different virtual machines may run different operating systems. The virtual machine 898 may load and execute an operating system 896 and applications 897 from the virtual memory 894. The operating system 896 and applications 897 used by the virtual machine 898 may be stored using the virtual disk 895. The virtual machine 898 may be stored as a set of files including (a) a virtual disk file for storing the contents of a virtual disk and (b) a virtual machine configuration file for storing configuration settings for the virtual machine. The configuration settings may include the number of virtual processors 892 (e.g., four virtual CPUs), the size of a virtual memory 894, and the size of a virtual disk 895 (e.g., a 10 GB virtual disk) for the virtual machine 895.

The virtualized infrastructure manager 899 may run on a virtual machine or natively on the server. The virtualized infrastructure manager 899 corresponds to the virtualization module 106 above and may provide a centralized platform for managing a virtualized infrastructure that includes a plurality of virtual machines. The virtualized infrastructure manager 899 may manage the provisioning of virtual machines running within the virtualized infrastructure and provide an interface to computing devices interacting with the virtualized infrastructure. The virtualized infrastructure manager 899 may perform various virtualized infrastructure related tasks, such as cloning virtual machines, creating new virtual machines, monitoring the state of virtual machines, and facilitating backups of virtual machines.

Figure 9:
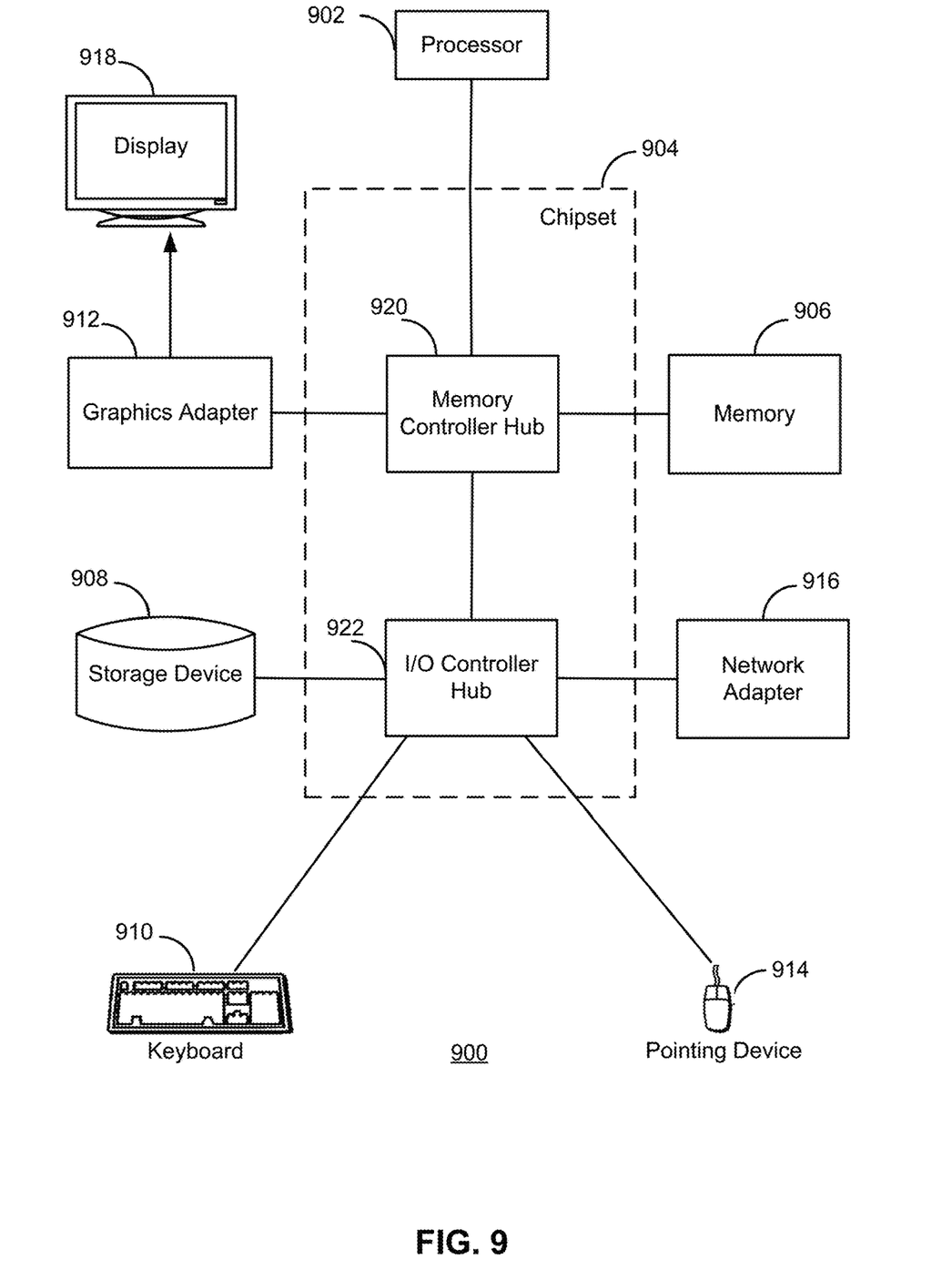
FIG. 9 is a block diagram of a computer system suitable for use in a DMS system, according to one embodiment.

FIG. 9 is a high-level block diagram illustrating an example of a computer system 900 for use as one or more of the components shown above, according to one embodiment. Illustrated are at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display device 918 is coupled to the graphics adapter 912. A storage device 908, keyboard 910, pointing device 914, and network adapter 916 are coupled to the I/O controller hub 922. Other embodiments of the computer 900 have different architectures. For example, the memory 906 is directly coupled to the processor 902 in some embodiments.

The storage device 908 includes one or more non-transitory computer-readable storage media such as a hard drive, compact disk read-only memory (CD-ROM), DVD, or a solid-state memory device. The memory 906 holds instructions and data used by the processor 902. The pointing device 914 is used in combination with the keyboard 910 to input data into the computer system 900. The graphics adapter 912 displays images and other information on the display device 918. In some embodiments, the display device 918 includes a touch screen capability for receiving user input and selections. The network adapter 916 couples the computer system 900 to a network. Some embodiments of the computer 900 have different and/or other components than those shown in FIG. 9. For example, the virtual machine 704, the physical machine 708, and/or the DMS node 714 in FIG. 7 can be formed of multiple blade servers and lack a display device, keyboard, and other components.

The computer 900 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 908, loaded into the memory 906, and executed by the processor 902.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for processing personal data from a relational database including a plurality of data tables, each data table having columns of attributes and rows of records, the method comprising:
   generating a sample of data representing data contained in a column of a first data table;
   analyzing the sample of data to identify personal data;
   based on analyzing the sample of data, marking the first data table as containing the personal data in conjunction with backup of the relational database;
   receiving a request to generate a record of personal data of a subject, the record of personal data corresponding to one of known types of personal data of the subject;
   determining that the column of the first data table contains the one of known types of personal data of the subject and that the column of the first data table contains a first key that references a second data table that is marked as containing the personal data;
   identifying a second key in a third data table that references the column of the first data table, the third data table being marked as containing the personal data; and
   in response to the request, generating the record of personal data of the subject based on data in the first data table, the second data table, and the third data table.

2. The method of claim 1, wherein analyzing the sample of data to identify the personal data comprises:
   determining whether the sample of data matches a predetermined list of known types of personal data.

3. The method of claim 2, wherein the predetermined list of the known types of personal data includes at least one of a name, personal identity information, a physical address, an email address, a phone number, financial information, investment information, medical information, a social networking post, an IP address, a MAC address, a domain name, or a device identifier.

4. The method of claim 2, wherein determining whether the sample of data matches the predetermined list of the known types of personal data comprises:
   responsive to determining that the sample of data matches one of a dictionary of text strings, determining that the sample of data includes personal data;
   responsive to determining that a format of the sample of data matches one of a list of formats, determining that the sample of data includes personal data; and
   responsive to determining that the sample of data matches data of columns determined to contain personal data, determining that the sample of data includes personal data.

5. The method of claim 2, wherein determining whether the sample of data matches the predetermined list of the known types of personal data comprises:
   generating an estimate of probability that the sample of data matches one of the predetermined list of the known types of personal data.

6. The method of claim 1, wherein marking the first data table as containing the personal data is performed as a background job separate from responding to the received request.

7. The method of claim 1, further comprising:
   determining a matching score that is greater than a threshold value based on the sample of the data.

8. The method of claim 1, further comprising:
   determining a second set of data tables referenced by the first data table;
   determining a second set of rows in the second set of data tables, the second set of rows being referenced by a first set of rows in the first data table; and
   processing data associated with the second set of rows in columns that are marked as containing personal data.

9. The method of claim 1, further comprising:
   determining a second set of data tables referenced by the first data table;
   determining a second set of rows in the second set of data tables that reference the subject; and
   processing the data associated with the second set of rows in columns that are marked as containing personal data.

10. The method of claim 9, further comprising:
    determining a third set of rows in the first data table, the third set of rows referencing the second set of rows in the second set of data tables; and
    processing the data associated with the third set of rows in columns that are marked as containing personal data.

11. The method of claim 1, further comprising:
    determining a second set of data tables that reference the first data table;
    determining a second set of rows in the second set of data tables, the second set of rows referencing a first set of rows in the first data table; and
    processing the data associated with the second set of rows in columns that are marked as containing personal data.

12. The method of claim 1, further comprising:
    determining a second set of data tables that reference the first data table;
    determining a second set of rows in the second set of data tables that reference the subject; and
    processing the data associated with the second set of rows in columns that are marked as containing personal data.

13. The method of claim 12, further comprising:
    determining a third set of rows in the first data table, the third set of rows being referenced by the second set of rows; and
    processing the data associated with the third set of rows in columns that are marked as containing personal data.

14. The method of claim 1, further comprising:
    constructing a graph representing relationships among the plurality of data tables that are associated with the personal data; and
    traversing the graph to expand processing of data from the first data table to tables that reference or are referenced by the first data table.

15. The method of claim 1, further comprising:
    removing data from the column that are marked as containing personal data.

16. The method of claim 1, wherein processing the data comprises producing the data from the columns that are marked as containing personal data.

17. The method of claim 1, wherein the method complies with GDPR requirements.

18. A system for processing personal data from a relational database having a plurality of tables, each table having columns of attributes and rows of records, the system comprising:
    one or more processors;
    memory to store instructions that; when executed by the one or more processors perform operations comprising:
    generating a sample of data representing data contained in a column of a first data table;
    analyzing the sample of data to identify personal data;
    based on analyzing the sample of data, marking the first data table as containing the personal data in conjunction with backup of the relational database;

receiving a request to generate a record of personal data of a subject, the record of personal data corresponding to one of known types of personal data of the subject;

determining that the column of the first data table contains the one of known types of personal data of the subject and that the column of the first data table contains a first key that references a second data table that is marked as containing the personal data;

identifying a second key in a third data table that references the column of the first data table, the third data table being marked as containing the personal data; and in response to the request, generating the record of personal data of the subject based on data in the first data table, the second data table, and the third data table.

19. The system of claim 18, the operations further comprising:

determining whether the sample of data matches a predetermined list of known types of personal data.

20. The system of claim 18, the operations further comprising:

determining a matching score that is greater than a threshold value based on the sample of the data.

\* \* \* \* \*